(12) United States Patent
Pk

(10) Patent No.: US 10,978,893 B2
(45) Date of Patent: Apr. 13, 2021

(54) BATTERY SAFETY CARD

(71) Applicant: Sling Media Pvt. Ltd., Bangalore (IN)

(72) Inventor: Arun Pk, Bangalore (IN)

(73) Assignee: Sling Media Pvt. Ltd., Marathahalli (IN)

( * ) Notice: Subject to any disclaimer, the term of this patent is extended or adjusted under 35 U.S.C. 154(b) by 347 days.

(21) Appl. No.: 15/952,057

(22) Filed: Apr. 12, 2018

(65) Prior Publication Data
US 2019/0319466 A1    Oct. 17, 2019

(51) Int. Cl.
| | |
|---|---|
| H02J 7/00 | (2006.01) |
| G01K 13/00 | (2021.01) |
| H02H 7/18 | (2006.01) |
| H01M 10/48 | (2006.01) |
| H01M 10/44 | (2006.01) |
| H01M 10/42 | (2006.01) |
| H01M 10/0525 | (2010.01) |

(52) U.S. Cl.
CPC .......... *H02J 7/0031* (2013.01); *G01K 13/00* (2013.01); *H01M 10/0525* (2013.01); *H01M 10/425* (2013.01); *H01M 10/443* (2013.01); *H01M 10/486* (2013.01); *H02H 7/18* (2013.01); *H02J 7/0068* (2013.01); *H02J 7/00309* (2020.01); *H01M 2010/4271* (2013.01)

(58) Field of Classification Search
CPC ..................................................... H02J 7/0031

USPC ......................................................... 320/150
See application file for complete search history.

(56) References Cited

U.S. PATENT DOCUMENTS

| | | | | |
|---|---|---|---|---|
| 6,857,576 | B2* | 2/2005 | Peter ....................... | F01P 7/167 123/41.1 |
| 6,861,824 | B1* | 3/2005 | Liu ........................ | H02J 7/0068 320/137 |
| 8,860,376 | B2* | 10/2014 | Kimura .................. | H02J 7/0091 320/153 |
| 8,872,380 | B2* | 10/2014 | Shim .................... | H01M 10/425 307/80 |

\* cited by examiner

*Primary Examiner* — Edward Tso
*Assistant Examiner* — Ahmed H Omar
(74) *Attorney, Agent, or Firm* — Seed Intellectual Property Law Group LLP

(57) ABSTRACT

A system and method to disconnect a battery from a load circuit when the battery temperature is outside a selected high threshold or a low threshold. A plurality of temperature sensors are provided for sensing a high battery temperature and a low battery temperature. If the either the high temperature sensor or the low temperature sensor outputs an error signal, the battery is disconnected from the load circuits. The disconnection from the load circuits is carried out by disabling at least four different circuits, any one of which alone will disconnect the battery from the load circuits. These four circuits include a battery switch circuit, a power control circuit, a charge control logic circuit and a voltage regulator circuit. The plurality of temperature sensors provides a backup system in the event any one of the temperature sensors is defective.

20 Claims, 7 Drawing Sheets

BATTERY SAFETY CARD

BACKGROUND

Technical Field

This disclosure is related to ensuring safe operation of a lithium-ion battery and, in particular, having safety switches and backup safety switches to disconnect the battery from the system under selected temperature conditions.

Description of the Related Art

Lithium-ion batteries present a potential fire hazard if they reach certain temperature conditions, whether too high of a temperature or too low of a temperature. Hazards can also arise if charging or discharging of the battery occurs with the battery is above or below a selected temperature. Attempting to charge or discharge the battery at too high of voltage or current can also create problems. Mechanical abuse, such as physical pressure, and impact from an outside force may also cause fire hazards with a battery. Accordingly, a circuit which reduces the chance of an unsafe temperature, whether high or low, of a lithium-ion battery due to many types of possible electrical or physical conditions is beneficial to reduce the potential fire hazard.

BRIEF SUMMARY

According to principles of the present disclosure, a system and method to disconnect a battery from a load circuit when the battery temperature is outside either a selected high threshold or a low threshold is provided. A plurality of temperature sensors are positioned on a first side of a printed circuit board. These include at least one high temperature sensor and one low temperature sensor. A plurality of temperature pads are positioned on the second side of the printed circuit board and these are coupled to the temperature sensors. The printed circuit board is positioned to have the temperature pads thermally coupled to the battery.

If either the high temperature sensor or the low temperature sensor outputs an error signal, the battery is disconnected from the load circuits. In a preferred embodiment, there is a backup high and low temperature sensors that also output temperature error signals. These are provided in the event the first pair of temperature sensors and the circuits connected to them fail. The disconnection from the load circuits is carried out by disabling at least four different circuits, any one of which alone will disconnect the battery from the load circuits. These four circuits include a battery switch circuit, a power control circuit, a charge control logic circuit and a voltage regulator circuit. The plurality of temperature sensors provides a backup system in the event any one of the temperature sensors is defective.

In one embodiment, disabling the battery supply switch circuit, the input power supply disconnection switch circuit, the battery charge logic circuit and voltage regulators occurs simultaneously. In another embodiment, the disabling of the battery supply switch circuit, the input power supply disconnection switch circuit, the battery charge logic circuit and the voltage regulators occurs sequentially, with the voltage regulators being disabled before the battery supply switch is disabled. In one embodiment, a power control integrated circuit is disabled with any one of the battery supply switch circuit, input power supply disconnection switch circuit, or battery charge logic circuit is disabled.

According to one embodiment, a system is provided having a battery and a load circuit that receives power from the battery for its operation. There are a plurality of temperature pads thermally coupled to the battery that reach a temperature corresponding to that of the battery. The temperature sensors include a first high temperature sensor coupled to the plurality of temperature sensor pads that outputs a signal indicating that the battery temperature is above a first selected high temperature threshold. There is a first low temperature sensor coupled to the plurality of temperature sensor pads, the first low temperature sensor outputting a signal indicating that the battery temperature is below a first selected low temperature threshold. There is a second high temperature sensor coupled to the plurality of temperature sensor pads, the second high temperature sensor outputting a signal indicating that the battery temperature is above a second selected high temperature threshold. There is a second low temperature coupled to the plurality of temperature sensor pads, the second low temperature sensor outputting a signal indicating that the battery temperature is below a second selected low temperature threshold.

In one embodiment, the first and second high temperature selected threshold values are different, while in another embodiment, they are substantially the same as each other. Similarly, in one embodiment, the first and second low temperature selected threshold values are different, while in another embodiment, they are substantially the same as each other.

In one embodiment, combination of OR logic circuits are coupled to the various temperature sensors so that when anyone of the temperature sensors indicates the temperature of the battery is outside the threshold value for that particular sensor, an error signal is generated and the battery is fully disconnected from the load circuits and also from any source to charge it or discharge it.

In one embodiment, a printed circuit board is provided that contains the plurality of temperature pads thermally coupled to the battery to reach a temperature corresponding to that of the battery on a first side thereof and has, a second side thereof each of the first high temperature sensor coupled to the plurality of temperature sensor pads, the first low temperature sensor coupled to the plurality of temperature sensor pads, the first OR logic circuit that receives as inputs the output from the first high and low temperature sensors, the second high temperature sensor coupled to the plurality of temperature sensor pads, the second low temperature sensor coupled to the plurality of temperature sensor pads, the second OR logic circuit that receives as inputs the output from the first high and low temperature sensors and the third OR logic circuit that receives as inputs the output from the first OR logic and the second OR logic and outputs a third error signal if either the first or second and second inputs are error signals.

In another embodiment, a first temperature sensor constructed by a first technique coupled to the battery at a first location and a second temperature sensor constructed by a second technique coupled to the battery. Since the two temperature sensors are made by different techniques and preferably come from different sources, it is less likely that both will fail. If either first temperature sensor or the second temperature sensor output an error signal, a power control integrated circuit that is coupled to receive an input from the first temperature sensor constructed by a first technique and from the second temperature sensor constructed by a second technique will terminate all power to the load circuit from all sources and terminate all power to and from the battery.

DETAILED DESCRIPTION

Figure 1:
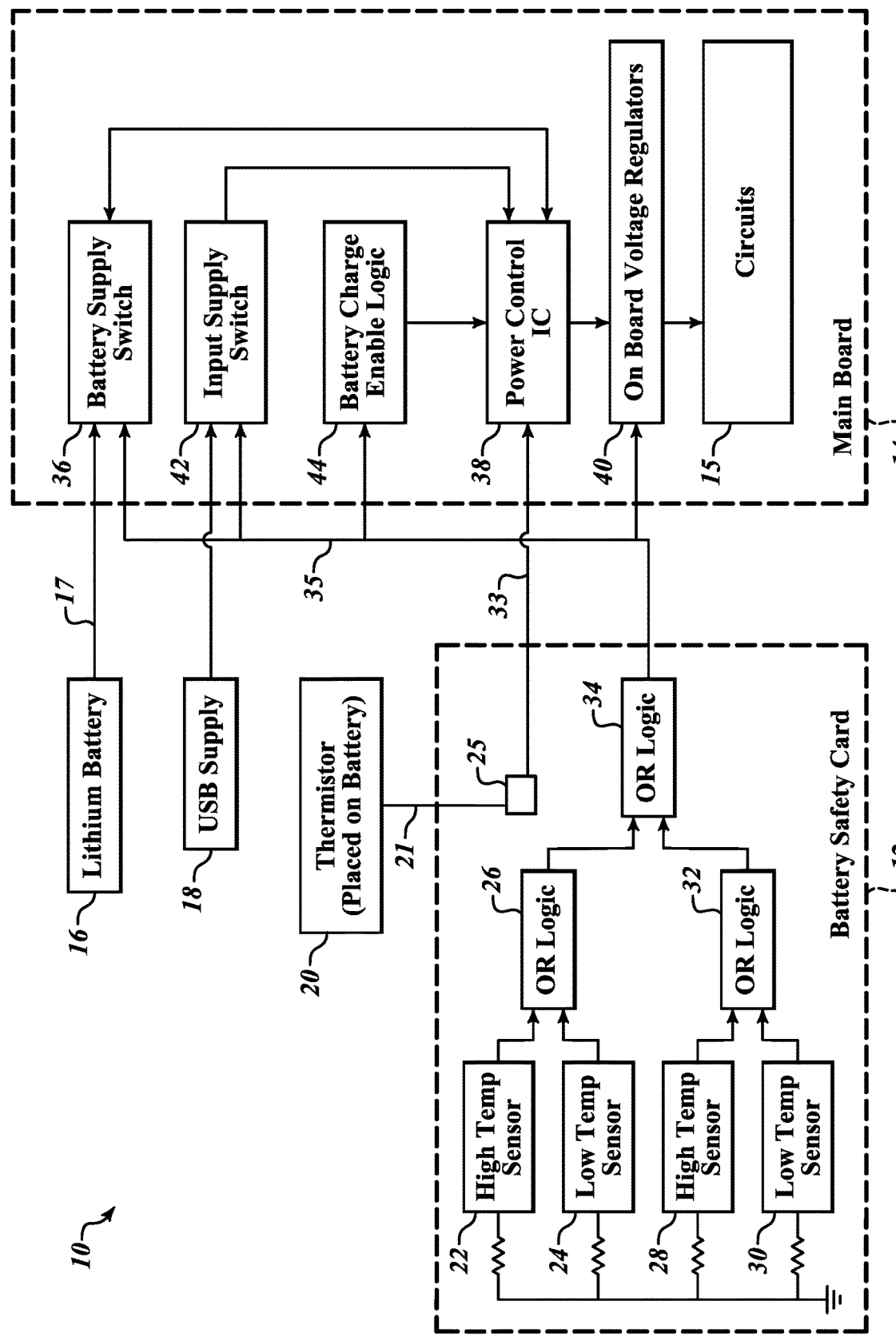
FIG. 1 is a block diagram of a circuit to reduce the fire hazard of a lithium-ion battery.

FIG. 1 illustrates a block diagram of a battery powered system 10 that includes a battery safety card 12, a main board 14, a lithium-ion battery 16, a USB port 18, and circuits 15 that are the load driven by the battery.

The battery safety card 12 includes a number of circuits mounted on a printed circuit board. These circuits include a first high temperature sensor 22 and a first low temperature sensor 24. The first high temperature sensor 22 and first low temperature 24 output the results of their temperature sense data to an OR logic gate 26. A second high temperature sensor 28 and a second low temperature sensor 30 output the results of their data to a second OR logic gate 32. The first OR gate 26 and the second OR gate 32 output their data signal to a third OR gate 34 that provides a temperature signal on output line 35. The battery provides power to the main board 14 on power output line 17.

The first high temperature sensor 22 senses the external temperature of the battery 16 by having a sensor placed directly on the battery case or by being thermally linked to the battery. Similarly, each of the sensors 24, 28, 30 sense the temperature of the battery by having separate, independent sensors in physical or thermal contact with the lithium-ion battery 16.

When the high temperature sensors 22, 28 sense a temperature that is above a selected threshold value, they output a high signal indicating that the temperature of the battery 16 exceeds a selected temperature value. When the low temperature sensors 24, 30 sense that the temperature of the battery 16 is below a selected threshold temperature, then each of them will output a signal indicating that the battery 16 is below the selected threshold temperature.

The output of the first high temperature sensor 22 and the first low temperature sensor 24 is provided to an OR gate 26. Therefore, if either of the outputs is high, namely if the battery 16 goes above the threshold high temperature or below the threshold low temperature, then one of the inputs goes is active and this causes the output of the OR gate 26 to be enable, which in one embodiments is a high voltage. Therefore, either a high or low condition, an excessive battery temperature or a low battery temperature, will cause the output of the OR gate 26 to go high.

Similarly, the second high temperature sensor 28 and the second low temperature sensor 30 will output high signals if the temperature they sense is higher or lower, respectively, than the selected threshold for their sensor circuits. Both of the outputs are fed into the OR logic 32, causing the output of the OR logic 32 to go high if either of the inputs is high. The respective temperature sensor probes for each of the temperature sensors 22, 24, 28, 30 are physically in contact with the battery 16 and are spaced apart from each other according to one embodiment. Accordingly, the high temperature sensor 22 can sense a high temperature condition of the battery 16 using a completely different probe physically spaced apart from the probe for the second high temperature sensor 28. The threshold values for the high and low temperature limits can be set using an external resistor, a program code, or other acceptable technique. According to one embodiment, the high temperature threshold is set at approximately 60° C., while in another embodiment it is set to somewhere between 65° C. and 75° C. The low temperature threshold is set at 0° C. in one embodiment, while in other embodiments it may be set at a value between −10° C. and −20° C. for a discharge operation while remaining at 0° C. for a charge operation. In one embodiment, the temperature thresholds to trigger a disconnection are the same for charging and discharging. Namely, the circuit will trigger to carry out the full disconnection at the same temperature thresholds for high and low, whether the battery is undergoing a charge or a discharge. In other embodiments, then it is permitted to have a first temperature threshold prevent charging of the battery and still permit discharging. Only when a second temperature threshold is crossed, whether higher to lower, is the discharging also prevented, as explained later herein.

The use of the high temperature sensor and the low temperature sensor provides backup protection for potential battery failure. Namely, the inventor has determined that two temperature conditions of a lithium-ion battery 16 may cause it to enter failure mode, a first one being that the battery has exceeded a selected threshold temperature. A second one being that the battery has gone below a selected threshold temperature. The inventor has realized that if the battery is below a selected threshold temperature and charging of the battery is carried out or the battery is called upon to output a large amount of power, this may cause, in some instances, a failure of the battery which may cause the battery to transition from below the selected temperature to an extremely high temperature or an explosion. The inventor has also determined that if charging or discharging of the battery occurs with the battery is above or below a selected temperature, this may cause a hazard. Namely, the battery itself being at 60° C. might not be a hazard. Similarly having the battery below 0° C. might not be a considered a hazard. But the inventor has determined that charging the battery, particularly with a high current or a high voltage, when battery is above 60° C. or below 0° C. may cause the battery to deteriorate and then enter a potential fire hazard condition. Further, charging the battery one time when it is below 0° C. may not cause a problem on that particular charge, but doing so will affect the physical and chemical structures inside the battery so that at a later time, the modification made to the battery due to charging at a high current while at a low temperature wil cause the battery at some future time to enter a failure mode.

Accordingly, according to principles of the present disclosure the temperature of the lithium-ion battery 16 is sensed to protect against either too high of a temperature condition or too low of a temperature condition and will prevent any charging or discharging of the lithium-ion battery 16, along with fully disconnecting it from the system in the event of either condition. A charging system (or a discharge operation) might to apply a very high current or voltage to the cells inside of a cold (or hot) battery, which might cause the battery to deteriorate while being charged or discharged so that at some future time, it fails and/or becomes more susceptible to a fire hazard. The present disclosure prevents the charging of a battery when it is too cold or too hot, but it might still be well within its specification stated operation range.

The second high temperature sensor 28 and the second low temperature 30 is an exact replica of the first protection circuit having a first high temperature 22 and the first low temperature sensor 24. This is a backup circuit in the event that there is any kind of failure or error in the first high temperature circuit and first low temperature sensing circuit. If one of the sensors 22 or 24 of the OR gate of the first sensor system becomes nonoperational, whether because of a failure, poor solder joint, incorrect glue, or any other reason, the backup sensors 28, 30 and the OR gate 32 will provide the backup replica as a further safety to prevent the battery 16 from going into failure mode. The probability of all four sensors becoming nonoperational is very low. the output of OR gates 26, 32 is fed as the two inputs of the OR gate 34 so that if either of the outputs goes high, then the output 35 of OR logic 34 goes high. Since any one of the sensors 22, 24, 28, 30 can cause the output 35 of the final OR gate 34 to go high, then this provides a strong backup system.

The output 35 of OR gate 34 is fed to the main board 14 which controls interaction between the battery and the circuit 15 to be protected. The main board 14 includes a number of control circuits that control the interaction between the battery 16 and the USB port 18 and the circuit 15 that is powered by the battery 16 and the USB supply 18. The main board 14 contains a shutdown circuit that terminates all power to the load circuits 15 and all power to and from the battery 16 if an error signal is received from the OR logic 34. This shutdown circuit contains a number of independent circuits 36, 38, 40, 42, and 44 as will now be explained.

The output 35 of the OR logic 34 which indicates that a temperature error has occurred is input to a battery supply switch circuit 36. This battery supply switch circuit 36 receives as an input the power from the battery 16. The battery supply switch provides the power from the battery 16 through its switch 36 to a power control integrated circuit (IC) 38. The power control IC 38 provides the output of the battery to one or more voltage regulators 40 and the outputs of the voltage regulators 40 is provided to the circuit 15 that is operated by the battery.

In some cases, some or all of the circuits 15 will be on a separate board and at a different location than on the main board 14, so it is not required that they be on the main board, this is just one example.

In the event there is a temperature error signal output 35 by the OR gate 34, the battery supply switch is disabled, which completely disconnects the lithium-ion battery 16 from any other parts of the main board 14. The battery supply switch 36 in one embodiment is the first circuit on main board 14 that the battery power passes through, prior to passing through any other circuits that can draw power. In particular, when the battery supply switch 36 is disabled, the lithium-ion battery 16 is disconnected from all other circuits on the main board 14, including capacitors, trim resistors and other circuits that might potentially draw power if they enter failure mode. The power is also disconnected from the power control IC 38, which also disconnects it from the voltage regulator 40. This provides a first level of safety to ensure that the event the lithium-ion battery 16 goes above or below the selected threshold temperatures it is completely disconnected from the circuit 15 that it provides power to as well as being disconnected from the power control IC 38 and the rest of the main board 14. Since power control IC 38 is not receiving any power when the battery supply switch 36 is disabled, then it also has its power output disabled to the voltage regulator 40.

The temperature output signal 35 from the OR gate 34 is also input to an input supply switch 42. The input supply switch 42 has as an input the USB port 18. The USB port can receive power from an outside source, such a wall plug, a USB power supply, another battery, or other location. The input supply switch 42 receives the power that comes from the USB supply 18 and inputs it to the power control IC 38. During normal operating conditions, the power control IC 38 will receive power input from the input supply switch 42 that comes from the USB supply 18 and deliver this to the voltage regulator 40 which delivers the power to the circuit 15 so they can be powered by the USB supply 18. In addition, the power control IC 38 can also output the electrical power from itself back to the battery supply switch 36 which can output charging power to the lithium-ion battery 16. In particular, the power that is supplied to the USB port 18 can be carried by the input supply switch 42 through the power control IC 38 back to the lithium-ion battery 16 in order to charge the battery under control of the power control IC 38. In this instance, the power control IC 38 acts as a battery charger integrated circuit. It can provide output to power the circuit 15, charge the battery 16, or a combination of both at the same time.

In the event the output 35 of the OR gate 34 indicates a temperature error, the input supply switch 42 is disabled. This will completely disconnect the input to the main board 14 from any power coming from the USB supply that would be used to charge the battery 16 or to operate the circuits 15. This will ensure that the entire system is shut down and no further charging can occur and no additional heat can be generated by the system in the event that a temperature error signal occurs. This provides the additional safety protection of ensuring that all power input to the power control IC 38, whether from the lithium-ion battery 16 or from the USB supply 18, is disconnected and that no power from any source can reach the power control IC 38.

The output 35 of OR gate 34 that provides the temperature error signal is also connected to a battery charge enable logic circuit 44. The battery charge enable circuit 44 is a backup protection switch from the other two. It is a separate circuit that must be active in order to enable the various voltage supplies on the main board 14, as well as the power control IC 38. If the battery charge enable circuit 44 outputs a disabled signal, then various voltage supplies on the main board 14 are shut down and, in addition, the power control IC 38 is disabled so that it can no longer output any signals. Specifically, once the power control IC 38 is disabled it can no longer output a battery charge current to the lithium-ion battery 16 and, if it is receiving power from any source, it can also no longer output any power toward the circuit 15. Thus, when the battery from the power control IC 38 is disabled, by the battery charge enable logic 44, it can no longer output a power supply signal to any source. This provides a backup disable circuit in the event there is a fault in either one of the battery supply switch 36 or the input supply switch 42.

Since each of these switches 36, 42 can receive power from an independent source, either the battery or the USB port, respectively, and may enter a failure mode for different reasons, having a completely independent battery charge enable logic 44 which also receives the temperature error signal and has the ability to shut down the power control IC 38 provides additional backup to further ensure that in the event the lithium-ion battery 16 is outside the acceptable temperature range, it will be fully disconnected from the circuit 15 as well as from any ability to be charged by an outside source. Since the sole source by which the lithium-ion battery 16 can be charged is from the USB supply 18 and this is under the control of the power control IC 38, this provides a second, backup technique to disconnect the lithium-ion battery 16 from a charging source in the event the input supply switch 42 fails in the on mode and attempts to continue to supply power to the battery 16 when it has received an error signal to shut it down. The power control IC 38 is interposed between the input supply switch 42 that receives the USB power and the lithium-ion battery 16 and it can be disabled by the battery charge enable logic 44, thus providing another circuit that can terminate the charging operation and any power being provided to the battery 16.

In addition, the battery supply switch 36 must also be enabled in order to output power from the power control circuit 38 back to the lithium-ion battery 16 in order to charge it. If the input supply switch 42 and the battery charge enable logic 44 fail in the on mode then the battery supply switch 36 is another backup protection since if this circuit is disabled then power cannot be provided from the power control circuit 38 back to the battery 16. Once the battery supply switch 36 is disabled, then power cannot be carried either direction, namely power cannot be provided from the power control IC 38 back to the battery 16 and power cannot be provided from the battery 16 to the power control circuit 38. This particular combination ensures that the battery charging is fully disabled in the event there is a fault in any two of the three systems that causes them to continue to be enabled when a temperature error occurs.

The output 35 of logic OR gate 34 having the temperature error signal at its output is also provided to the voltage regulators 40 of the main board 14. The output 35 of the OR gate 34 is provided to the voltage regulators 40 in order to fully disable any power that is provided to the circuit 15. This is a further backup protection to make sure that if any one or all of the switches 36, 38, 42, 44 is faulty, then the voltage regulators will be shut down and prevent any further power being provided to the circuit 15.

Once the power is shut down, the further power draw from the lithium-ion battery 16 ceases, thus permitting the temperature of the battery 16 to stabilize and return to within an acceptable operating range. Disabling the voltage regulators 40 has the effect of powering down the entire circuits that use the power of the system 10. The entire source of power, whether from the USB supply 18, the battery 16, or any other source, is completely removed and all output into the circuits 15 is terminated.

In summary, the temperature error signal 35 out of the OR logic 34 can be generated by any one of four temperature signals indicating that the temperature of the battery 16 is outside the threshold range of operation. In the event that the output indicates a temperature error, then the error signal is fed to four different circuits any one of which has the effect of terminating all supply of power to the circuit 15, thus protecting the circuit and terminating any further draw from the battery 16. In addition, three of the circuits have the effect of shutting down the power control IC 38 which will effectively terminate all current being drawn from, or sent to, the battery 16. The power control IC 38 can be shut down by any one of three switches outputting a disable signal, the battery supply switch 36, the input supply switch 42, or the battery charge enable logic 44. In addition, if the battery supply switch is disabled and, due to some circuit error or wiring disconnection, none of the other circuits on the main board 14 are disabled, this will still have the immediate effect of disconnecting the battery 16 from the system so that it cannot supply output power nor can it receive a charging power, thus effectively isolating the battery 16 from the system. This is a third backup system to fully isolate the battery 16 from the system. In addition, the input power that comes from USB supply 18 must pass through three separate circuits in order to be provided back to the battery 16, namely, it must pass through the input supply switch 42, the power control IC 38, and the battery switch 36, and if any one of these is disabled, then no power can be provided to the battery 16, thus preventing the battery 16 from receiving additional power which may cause heating when the temperature is outside the preset selected threshold regions.

In addition to the temperature sensors which are on the battery safety card 12, a separate thermistor 20 is provided which is directed placed on the battery casing at a different location, spaced from the battery safety card 12. The thermistor 20 has a different temperature sensor probe at a different location than the temperature sensors 22-30 permitting it to sense the temperature of the battery independent of any temperature sensor on the battery safety card 12. The output of the thermistor 20 is provided through the battery safety card 12 as an input to the power control IC 38.

The thermistor 20 outputs a signal on line 21 indicating whether the battery has exceeded an extreme temperature. In one embodiment, the thermistor 20 senses only the battery 16 exceeding a high temperature values, such as 75° C., 80° C., or other selected value. In another embodiment, it has the ability to output a signal indicating the extreme temperature is either high or low, namely whether the battery has exceeded a selected threshold temperature or gone below a selected threshold temperature. In one embodiment, the selected threshold temperatures for the thermistor 20 are the same as those which have been set for the temperature sensors of the battery safety card 12. In another embodiment, the temperatures for the thermistor 20 are set to be slightly different from those of the temperature sensors of the battery safety card 12. In particular, the thermistor 20 may have the selected thresholds in the range of 5-10° C. higher than those of the battery safety card 12, as well as, in the embodiment in which it senses the low temperature as well, 5-10° C. lower than those of the battery safety card 12. It, thus, provides an additional safety check beyond that provided by the battery safety card 12.

The output from thermistor 20 is provided on line 21 into the battery safety card 12. On the card 12, it goes into a socket and signal is provided as an output on line 33 that is input to the power control IC 38 on the main board 14.

The thermistor 20 is a particular type of construction for a temperature sensor that is resistor based and having all the circuitry to create an output signal in the probe itself. Namely, the resistance of the sensing circuit in thermistor 20 can change with temperature and an electrical signal is output from the probe that provides an indication of the temperature at the tip. The temperature sensors 22-30 are of a different type of construction because they are mounted on one side of a circuit board and obtain temperature data of the battery from thermal pads on the other side of the same board. They might be resistor based in their sensing, similar to a thermistor, but they were constructed at a different time, using a substantially different process, preferably by a different company. Therefore, if the construction technique to make thermistor 20 is flawed, the temperature sensors 22-30 will not have the same flaw since they are made a different construction process, at a different time and at a different location, and, in a preferred embodiment, by a different manufacturer. Thus, the two different temperature sensors have independent sources of supply in the market place and independent types of construction from each other.

Further, to provide even better backup capability, the temperature sensors 22-30 can be of a different type, for example, they can be semiconductor based sensors, which is preferred since they are mounted on a PCB, or Negative Temperature Coefficient sensors, or Resistance Temperature detectors or a thermocouple, though use a thermocouple is not preferred, it is possible. The temperature sensors 22-30 have a different structure and are made by a different manufacturing process than the thermistor, thus, even if they are resistor based, they are of a different type and it is less likely that both will fail since they are made by different manufactures and by different manufacturing process from each other.

As shown in FIG. 1, if the thermistor 20 outputs a temperature signal, this is provided directly to the power control IC 38 which will power down the entire system. If the input from the thermistor 20 indicates a temperature which is outside the acceptable operating range, then all power that is being output from the power control circuit will be terminated, thus disconnecting all power that is being output to the regulators 40 and, thus, to the circuits 15, as well as disconnecting all power that is going into or out of the battery 16 and all power that is coming in from the USB port 18 from any other circuits in the system whether the battery 16 or the circuit 15. This provides yet another temperature safety circuit in the event that the battery safety card 12 fails and one or more of the switches 36, 40, 42, 44 enter a failure mode.

In addition, the battery pack module has an internal thermistor (not shown) that is used as part of the standard battery supply system that is internal to the battery and part of the main board for accurate estimation of the remaining charge available. This is also part of the battery charge logic that is part of an internal thermistor within the lithium-ion battery 16. This is yet a second thermistor which, while not shown, is part of the battery input signal that comes from the lithium-ion battery 16 that is provided from the battery switch 36 to the power control IC 38. In some prior art systems, it is only this internal thermistor that is used to check the battery temperature. In the event the signal from the battery 16 indicates that it is outside the operating temperature range as provided via the battery supply switch 36 to the power control IC 38, this is also useful to terminate all charging of the battery as well as supply of power from the battery to the circuits. Therefore, if the battery itself indicates that it is outside the temperature range, then the power control IC 38 terminates all input power going to the battery as well as all output power coming from the battery to any other source.

As can be seen, if there is any fault in any of the various circuits which have been provided there are a number of backup circuits to provide system protection. This will ensure that the battery is never charged when the battery safety card is not connected to the system.

In one embodiment, the temperature error signal 35 is a low voltage or zero voltage signal, not a high voltage signal. Therefore, if the output from the battery safety card 12 becomes disconnected from the main board 14, then this will be recognized as a temperature error signal from both the OR logic 34, or the thermistor 20, or both. Namely, the output of OR logic gate 34 can be inverted to require that a positive voltage be provided when the temperature is within the acceptable range and in the event the output goes low either because the circuit becomes disconnected for any reason, such as damage to the system when the system was dropped, cracked, or disconnection for some other reason, or the thermistor signal 20 which is delivered via the battery safety card 12 becomes disconnected, then this will further act to disconnect the battery and the USB supply from the circuit 15.

The battery safety card 12 has the various temperature sensor as previously described along with the input and output connections for the thermistor which provides an additional source for temperature monitoring. The appropriate logics are provided to ensure proper OR function of the outputs to generate the temperature error signal. As previously explained, there is a backup set of temperature monitoring in the battery safety card 12 in the event that any one component is faulty. Further, in one embodiment the output of the OR gate 34 is inverted so that a low signal indicates an error and a high signal at a high voltage must be delivered to indicate that the circuits on the main board 14 can operate. Therefore, any reason for disconnection of the system, whether a defect in the electrical line 35 or any other part of the circuit, will cause the battery 16, the input from USB port 18, and other parts of the system to be fully disconnected. The battery safety card 12, therefore, monitors the temperature of the battery 16 and ensures that the load is disconnected as soon as there is an extreme temperature event, either high or low. This will protect the battery operated device from almost all failure conditions. In addition, it will also protect the battery from going into failure mode. Namely, the temperature thresholds are set prior to the battery reaching a failure mode, either too high or too low of a temperature, both of which have a significant impact on lithium-ion batteries. Therefore, action is taken to preserve the battery both from being charged and discharged at any extreme temperature, whether high or low.

Figure 2A:
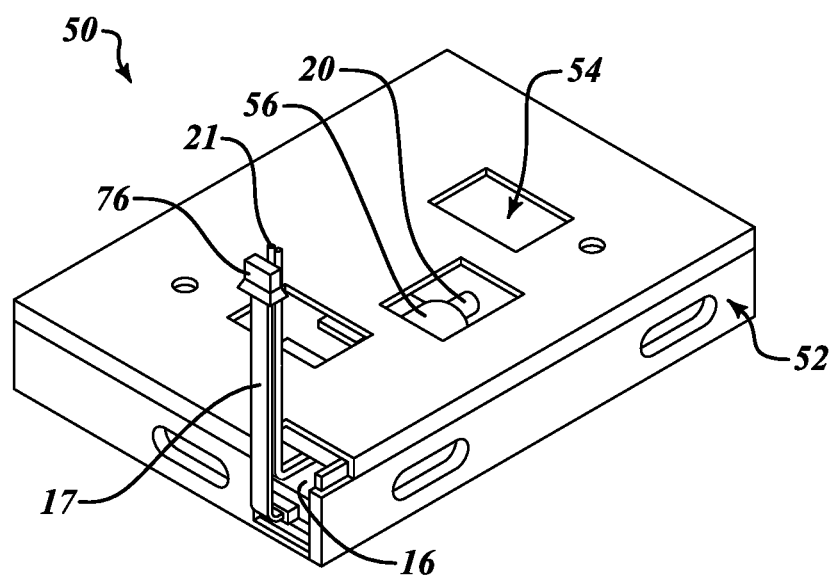
FIG. 2A is an isometric view of the battery module according to principles of the present disclosure.

FIG. 2A illustrates a completed battery module 50 having the battery 16 therein together with other components. The battery module 50 includes a housing 52, which has an upper case 52a and a lower case 52b. The upper case 52a has a number of apertures 54 which are positioned in order to assist in the battery monitoring process as explained herein. The battery 16 has a power output line 17 which provides the output from the battery and also receives charging power to charge the battery 16. The thermistor 20 is directly affixed to the outside case of the battery 16. Preferably, the thermistor 20 is secured to the battery 16 using an acceptable adhesive such as kapton tape, electrical tape, or other acceptable technique. In the example provided, two pieces of kapton tape 56 overlay the thermistor 20 and directly connect it to the battery 16. One of the pieces of tape 56 directly overlays the thermistor and another piece of tape may be used to the secure the signal cable 21 to ensure it is in the proper location and that it exits the battery module 50 at the same point as the battery cable 17. In some embodiments, an adhesive pad 58 is placed under the battery 16 to assist in adhering it to the bottom housing 52b.

Figure 2B:
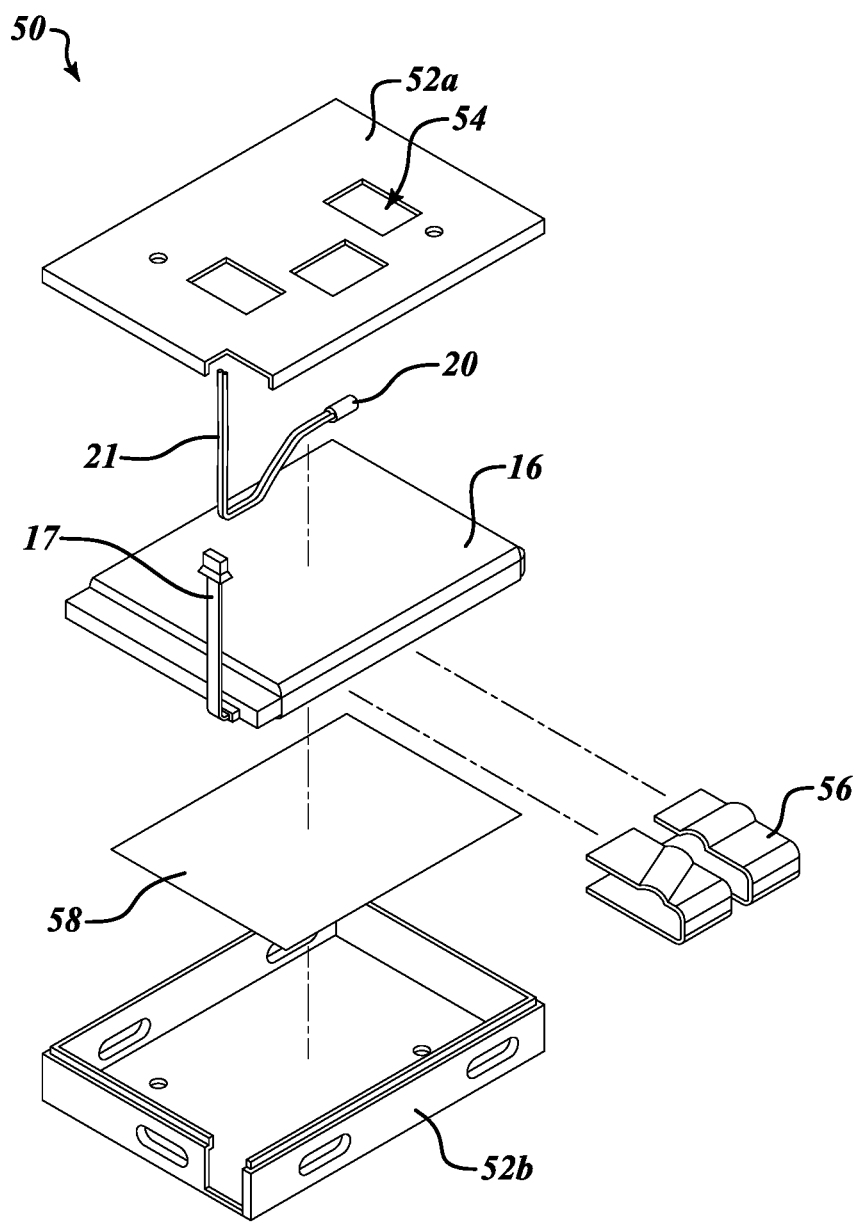
FIG. 2B is an exploded view of the battery module of FIG. 2A.

As shown in FIGS. 2A and 2B, the apertures 54 of the top cover 52 are aligned to assist in monitoring the battery functions and temperature. Preferably, the thermistor is positioned so that the thermistor itself is connected to the battery 16 aligned with one of the apertures 54. Other apertures 54 are provided to permit thermal contact with the battery safety card 12 as explained elsewhere herein.

Figure 3A:
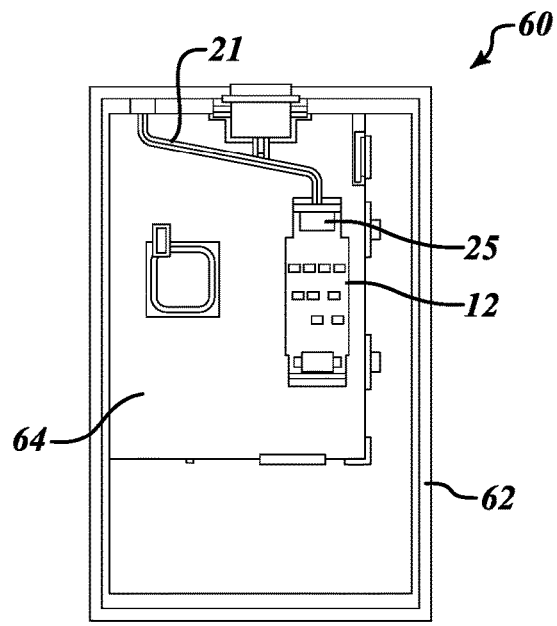
FIG. 3A is a top side view of a power supply compartment according to principles of the present disclosure.
Figure 3B:
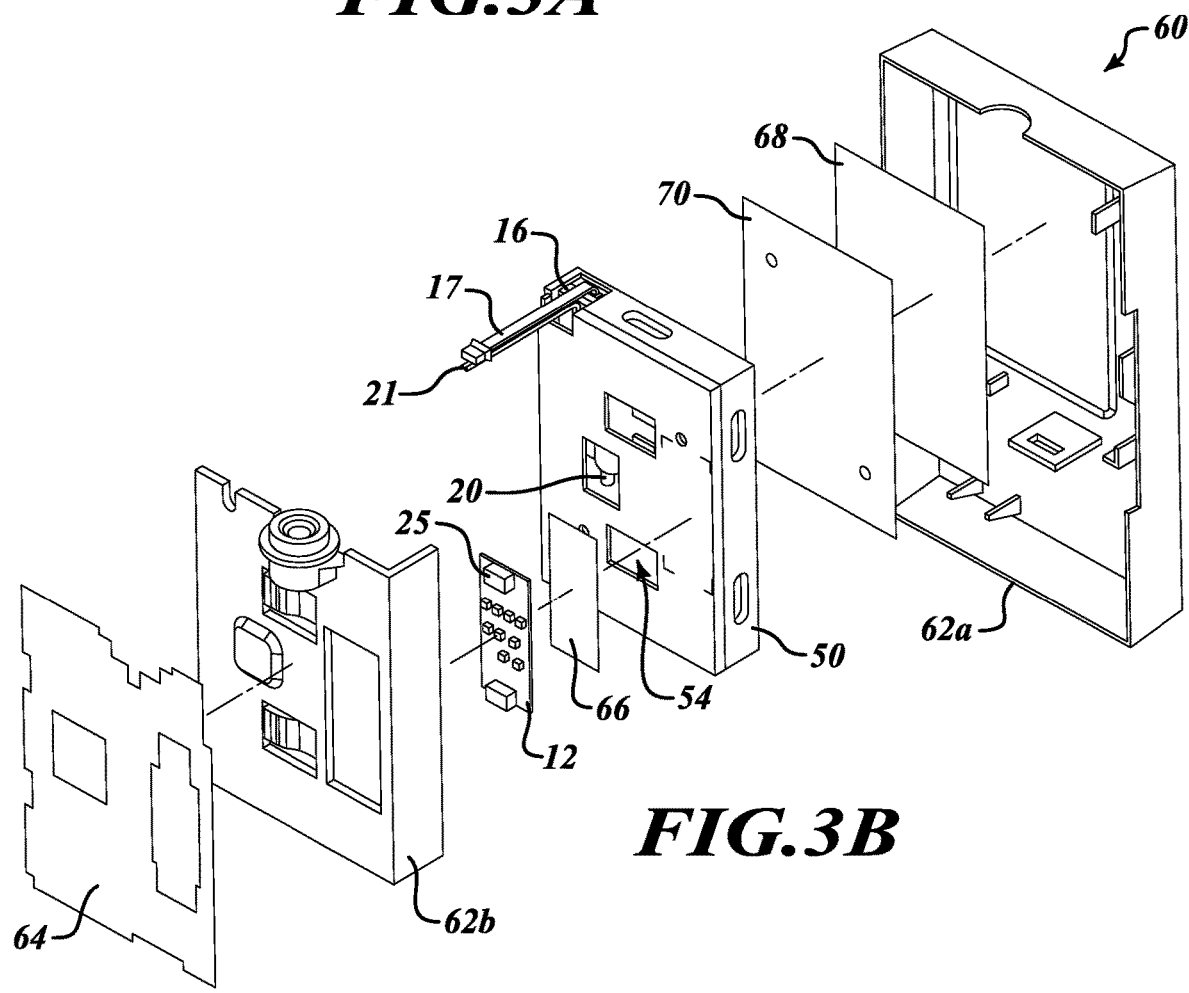
FIG. 3B is an exploded view of the power supply compartment of FIG. 3A.
Figure 3C:
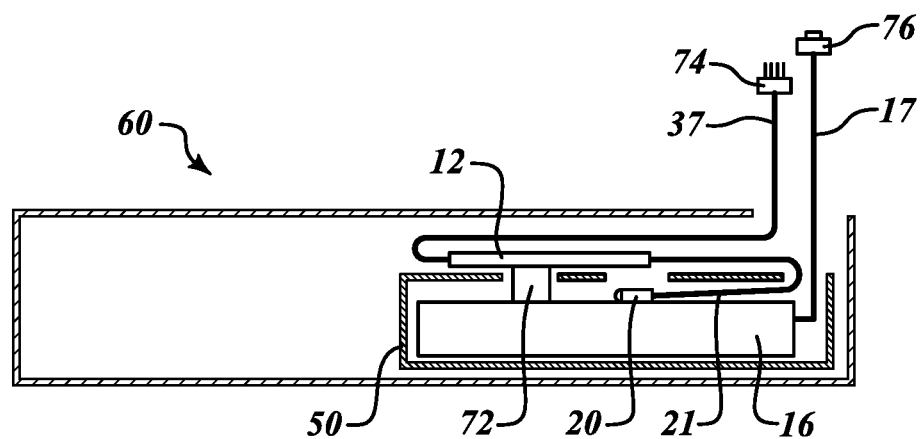
FIG. 3C is a schematic of a cutaway side view of the power supply compartment of FIG. 3A.

A completed power supply compartment 60 is shown in FIGS. 3A, 3B, and 3C. The power supply compartment 60 includes the battery module 50 and the battery safety card 12 as the primary components. The power supply compartment 60 includes a bottom housing member 62a and top housing member 62b. A cover layer 64, which can act as a pad, an adhesive layer, or a temperature isolation layer, can be placed over the top cover 62b. This cover layer 64 has the appropriate apertures and cutouts to not interfere with the operation of the battery safety card 12. The thermistor output line 21 plugs into socket 25 on the battery safety card 12.

The battery safety card 12 has its bottom most surface abutting against the battery 16 through one of the apertures 54, as shown in FIGS. 3B and 3C. In one embodiment, a heat spreader pad 66, which has good thermal conductivity, may be positioned between the battery safety card 12 and the battery 16 itself. Preferably, the battery safety card 12 receives as close as possible the exact temperature of the battery 16. In some embodiments, this is best achieved by having thermal pads on the battery safety card 12 abut against the housing of the battery 16 itself so that there is different physical contact, while in other embodiments it is preferred to have a thermal transfer sheet 66 positioned there between in order to provide good thermal transfer of the battery temperature to the thermal sensing pads 72 causing the battery safety card 12 to be thermally coupled to the battery. In one or more embodiments, various cushion pads and adhesive pads 68, 70 may be placed between the battery module 50 and the bottom housing member 62a, depending upon the design criteria, or they may be left out. In a preferred embodiment, a heat spreader layer 66 is provided between the battery pad 72 and the battery 16 so that all the battery pads 72 are at the same temperature. The heat spreader 66 also provides good thermal contact between the battery 16 and the thermal pad 72 to further assist in ensuring that the average temperature of the entire battery is sensed by the thermal pad 72. Namely, the heat spreader 66 spreads across a significant portion of the battery, such as 20%, or in some embodiments 30%-60% of the battery face. The heat spreader 66, therefore, reaches the same temperature as the bulk of the battery 16 itself. The heat spreader 66 can be positioned either to overlay the battery module 50 and extend into an aperture 54 from above the battery housing 52 or, alternatively, it might be placed inside the battery housing 52 and be somewhat larger, and overlay a significant portion of the battery surface itself. Thus, in one embodiment, the heat spreader 66 has an area approximately 10% that of the entire battery, while in other embodiments it may have a surface area that is approximately half or 70% of the battery surface to which is adhered.

FIG. 3C shows a schematic of a cutaway side view of the completed power supply compartment 60. FIG. 3C shows a schematic, simplified view to illustrate the relative location of the main components rather than the exact location of every minor feature of the power supply compartment 60. It is not drawn to scale, but is rather drawn in schematic form to provide a clear view of the components. For example, pads 72 will not be thicker than thermistor 20 nor the battery safety card 12. Pads 72 are drawn to illustrate that they are in thermal contact the battery 16; in addition, in one embodiment, the thermal spreader pad 60 is present between the pads 72 and the battery 16 but this element is not shown in FIG. 3C since it is in schematic form. Other elements, such as socket 25 are not shown in FIG. 3C since it is a schematic representation and not an exact cross-section or side view.

As can be seen viewing FIG. 3C, the battery 16 is inside the battery compartment 50. The battery compartment 50 has an opening through which the battery cable 17 and the temperature error cable exit from the power supply compartment 60. FIG. 3C also illustrates that the thermistor 20 is affixed to the battery 16 and has the cable 21 which extends across the top of the battery and is input to the battery safety card 12. The battery safety card 12 has a number of thermal pads 72 affixed to the back side 74 thereof. In particular, the battery safety card 12 has a top surface which contains a number of integrated circuits, trimming resistors, capacitors, and other electronic components that make up the electrical circuits of the battery safety card 12, not shown in FIG. 3C for simplicity, but shown and described with respect to FIG. 1. On the backside 74 of the battery safety card 12 a number of thermal pads 72 which are thermally coupled to the battery, either by directly abutting against the battery 16 casing or having a heat spreader between them. The thermal pads 72 are designed to provide an efficient heat transfer from the battery so that the thermal pads 72 are at approximately the same temperature as the battery 16 at all times.

In a preferred embodiment, between six and ten thermal pads 72 are provided and, in one embodiment, nine such thermal pads are provided. Each of the thermal pads 72 will be at the same temperature as the battery surface which they contact. Preferably, the thermal pads 72 reach the temperature of the battery 16 itself to provide good sensitivity of the temperature of the battery at all times.

In one embodiment, the battery housing 52 is made of a metal with high thermal conductivity, such as aluminum. The aluminum is of a type that is lightweight and acts also as a heat spreader for any heat from any part of the battery. In one embodiment, the housing 52 is made of a metal which receives heat from all sides of the battery, the top side, the bottom side, as well as the edges. The heat is quickly and evenly spread throughout the entire battery casing 52 so that the battery casing 52 also reaches approximately the same temperature of the battery itself. Therefore, in that embodiment in which the heat spreader 66 overlays the battery case 52, it has the additional advantage that it receives heat from the battery housing 52 which it spreads to the location of the thermal pad 72 which is in contact with it. In this embodiment in which the heat spreader 66 overlays the metal battery housing 52, temperature from all parts of the battery, whether the top side or the bottom side, spread to the battery safety card 12 since thermal transfer is provided throughout the metal housing 52 that is fully around the battery and from there to the heat spreader 66 to the thermal pad 72. In this embodiment, the thermal pad 72 can be most likely assured to have a temperature that closely approximates the temperature of the battery module 50 itself, and thus is sensitive to heat or cold present on any part of the battery, rather than just a single location.

The high and low temperature sensors 22, 24, 28, 30 are thermally connected to the thermal pads 72. This can be accomplished by having metal connections, resistors, or other appropriate probes extending from the respective temperature sensors to one or more of the thermal pads 72. Preferably, each of the thermal pads 72 is at the same temperature as the others. In one embodiment, each temperature sensor 22, 24, 28 and 30 has a connection to each of the thermal pads 72. Therefore, the temperature of each of the thermal pads 72 is taken into account in determining the current temperature of the battery by each of the temperature sensors 22, 24, 28, 30. There are a large number of electronic temperature sensors available on the market, which upon having a first temperature available to them at an input probe are able to output an electrical signal indicative of the sensed temperature. Many such temperature sensor circuits are available on the open market and any one of those of the many that are available is acceptable for use in the current embodiments as described herein. Thus, the respective temperature sensors 22, 24, 28, 30 receive as an input temperature the average temperature provided by all the thermal pads 72 and use these to determine whether or not the battery has exceeded the set threshold high temperature or has gone below the selected threshold low temperature and output a signal indicative of the temperature going either above or below the selected threshold values.

Referring to FIG. 3C, it can be seen that the power supply compartment 60 outputs two cables, a battery power cable 17 and a temperature an error signal cable 37. In a preferred embodiment, the cable 37 that carries the temperature error signal line 35, the data from signal line 33 out of the thermistor 20 and also carries other signals and power. For example, in one embodiment, the cable 37 is a four-wire cable having an output head 74 in which one of the output lines is the temperature error signal line 35 and another output provides the thermistor signal output on line 21. The other two wires in the cable provide power, such as battery positive and battery negative to the battery safety card 12 to receive its operational power for the circuits which are contained hereon. The battery cable 17 includes a plug head 76 which carries power to and from the battery 16 as shown in FIGS. 1, 2A, and 3C.

The connecting heads 74, 76 are plugged into the main board 14 in the connections shown in FIG. 1. In particular, the main board 14 includes a receiving socket for the head 76 which contains the battery cable 17. It also has a receiving socket to receive the head 74 for cable 37 that contains the signal line 35 and the thermistor line 21, as well as provide power to and from the battery safety card 12.

Figure 4:
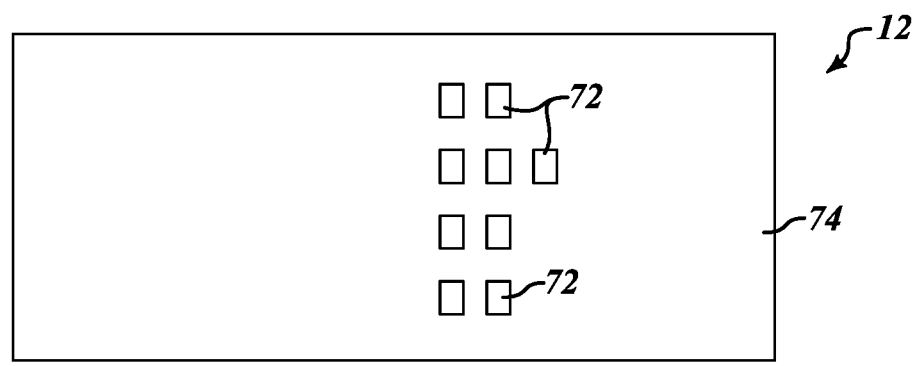
FIG. 4 is a bottom side view of a battery safety card according to principles of the present disclosure.

In FIG. 4, these respective inputs 21, 35 are shown as being input to the various circuits on the main board 14 and, as can be appreciated, these are provided on cable 37 and can be routed across the main board 14 as being received from the socket into which the head 74 has been plugged. Since the construction of the main board 14 and the various sockets to receive the heads 74, 76 is conventional, and well known in the art, further illustration of these plugins is not provided and any acceptable technique of the many available may be used for the respective heads, the sockets, and the routing of the electrical lines from the battery safety card 12 to the main board 14 to achieve the electrical connections as shown in FIG. 1.

Figure 5A:
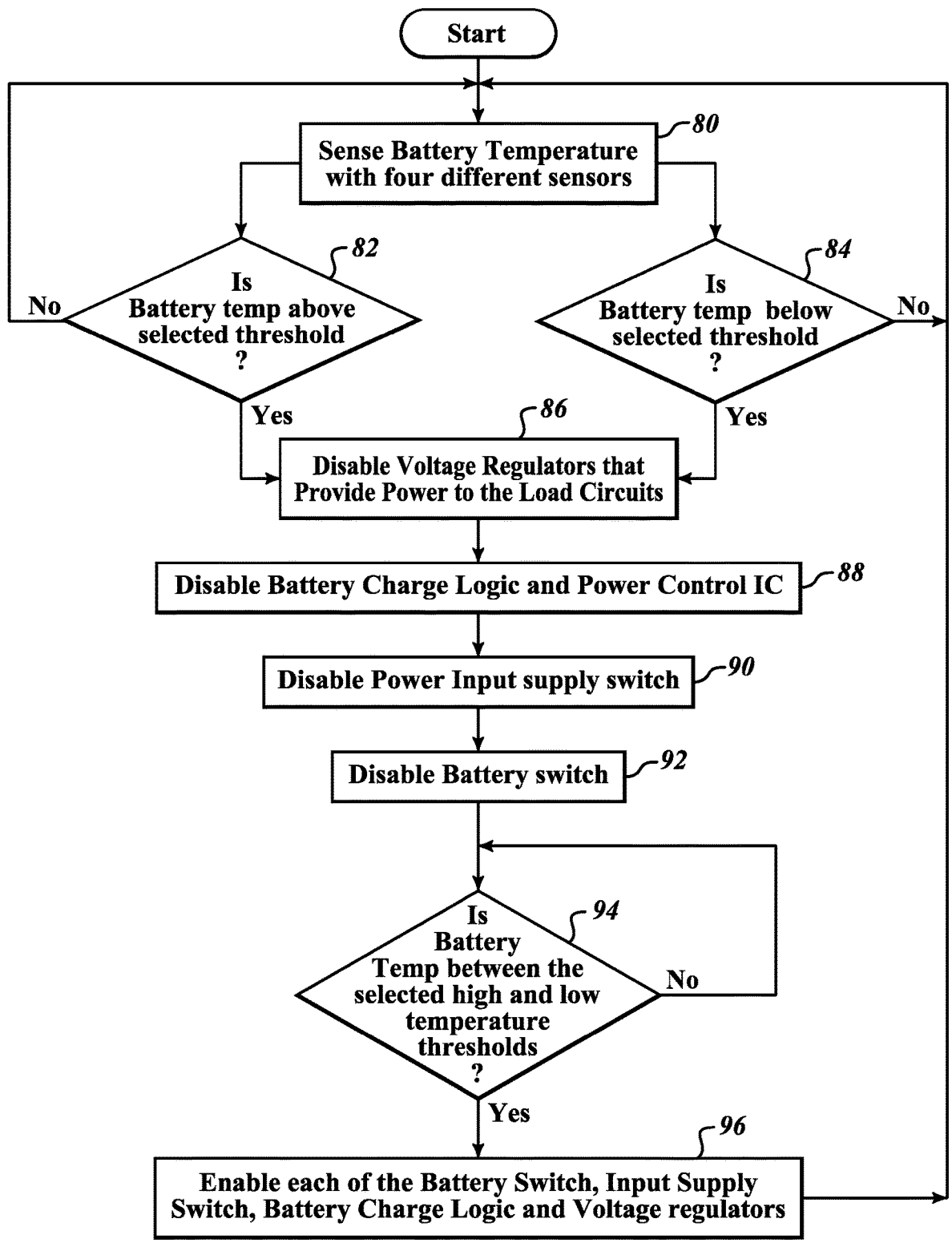
FIGS. 5A and 5B are flowcharts illustrating a sequence of steps to reduce fire hazard of a lithium-ion battery according to principles of the present disclosure.
Figure 5B:
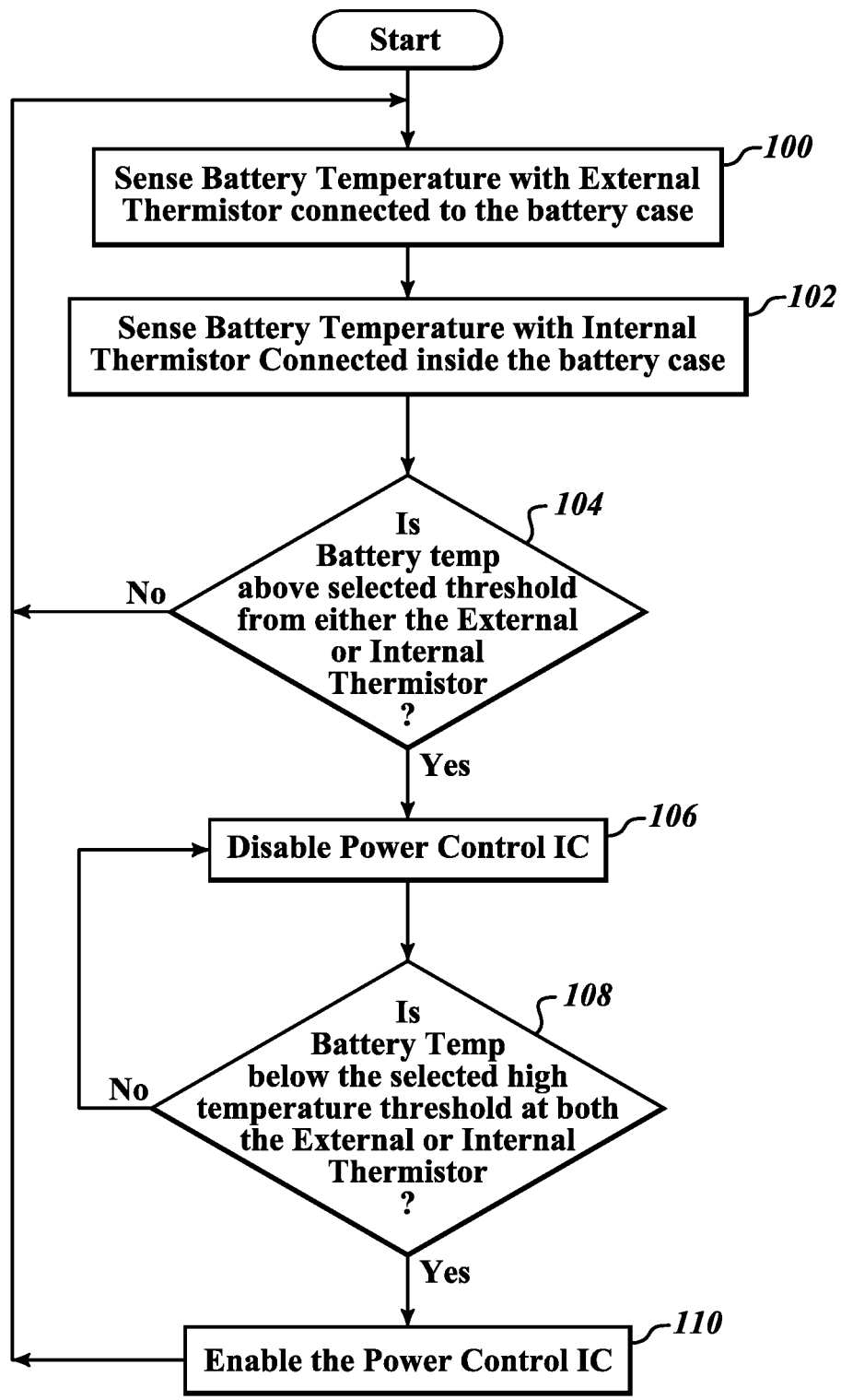

FIGS. 5A and 5B illustrate a method for carrying out the temperature sensing and battery disconnection sequence according to principles of the disclosure as taught herein. As shown in FIG. 5A, the sequence starts at step 80, sensing the battery temperature with four different sensors. At step 82, a test is done to determine if the battery temperature is above a selected threshold at two of the different sensors. Concurrently the sensing of step 84 is carried out to determine whether the battery is below the selected threshold. If the answer to either block 82 or block 84 is yes, then the sequence proceeds to the next set of steps, which include fully disconnecting the battery from the main board 14. This includes step 86 to disable the voltage regulators 40. It also proceeds to step 88 to disable the battery charge logic 44, which step also includes shortly thereafter or, in some cases, concurrently, to disable the power control IC 38. Step 90 of disabling the input switch 44 occurs, as does step 92 to disable the battery switch 36 that provides for an exchange of power to and from the battery 16.

In a preferred embodiment steps 86, 88, 90, and 92 occur concurrently and, preferably, simultaneously. Namely, simultaneously with the battery switch being disabled, the input supply switch is also disabled, as is the battery charge in step 88 and also the voltage regulators in step 86.

Alternatively, in one embodiment, the steps are carried out sequentially as shown. Namely, there are different embodiments for the sequence of shutting down the power going to and from the battery 16. The sequence may be based on some timing delay or timing set up in the circuit to turn off the circuits 15 and main board 14 in an orderly manner. For example, it may be desired to start to turn off the voltage regulators 40 first to allow them a short time, a few microseconds to orderly reduce the power to zero going to load circuits 15. For example, the signal to shut off the voltage regulators 40 can start to take action first, a brief time before the other signals take effect. The output from the voltage regulators 40 can first alert the circuits 15 that power is about to be lost. This will permit the circuits 15 to go through an orderly shutdown mode, such as saving data in a selected cache or shutting down certain logic is preferred order to preserve the integrity of the system 10. This signal from the voltage regulators 40 to the load circuits 15 can be sent as quickly as possible, as can be seen in FIG. 1, this is the most direct and shortest path from the main board 14 to the circuits 15. Thus, the signal from the voltage regulators 40 to the circuits 15 can arrive a brief time before power is fully cut by disabling battery switch 36.

The delay time between the voltage regulators 40 starting the shutdown and providing a signal to the circuits 15 that power is about to be lost can vary depending on the type of circuits, the thresholds levels and other factors. For example, the high temperature signal can have two or three thresholds, a first one a lower temperature, such as 60° C., that when reached will start an orderly shutdown of letting the voltage regulators 44 send a signal to the circuits 15 that power is about to be lost, then a brief time later, on the order of a few hundred microseconds or maybe one or two seconds the battery charge enable logic is turned off, which provides an orderly shutdown of the power controller IC 38, after which the input switch 42 is turned off that fully shuts down the power controller IC 38 and last of all the battery disable switch is turned off. This is just one possible shut off sequence and it is not required to be used in all instances. For example, in another embodiment, all circuits disconnect as quickly as possible and at the same time when the first threshold temperate is reached.

In yet another embodiment, there is a difference in shut off sequence based on the threshold passed. If only the first threshold, such as 60° C. is passed, there can be a slower, orderly shutdown in the sequence shown in FIG. 5A. But, if a second, higher threshold is passed, for example, 80° C. or 100° C., then the shutdown sequence is used that will be as fast as possible and all circuits are shut down simultaneously on main board 14. Thus, in one embodiment, there is a single shut down sequence and when the signal on line 35 from OR gate 34 goes high, all circuits disconnect as quickly as possible. Yet, in another embodiment, the signal on line 35 can carry additional information indicating whether this is a slow sequence shut down or a fast sequence shut down sequence and the circuits will be shut off in desired pattern.

Or, the decision could be based on whether the low temperature or high temperature threshold was reached. If the low temperature threshold triggered the shutdown, this is a low risk for the battery to catch fire since the risk for fire would be caused by trying to charge a very cold battery. If the battery becomes too cold and high charge current is applied, this can cause battery failure, which might suddenly cause the battery to explode, but there is little to no danger in drawing small amounts of power from a cold battery. In that case, the circuits 44 to charge the battery can be shut down first, but the battery supply switch 36 to draw power from the battery and voltage regulators can be left on for a period of time to provide power. They can remain on until the battery goes below another low temperature threshold or stabilizes.

It is expected that pulling current from the battery will cause it to heat up, so in one embodiment, when the battery goes below the first low temperature threshold, the circuit to charge the battery is disabled to avoid the risk of harm to charging a very cold battery, but switch 36 remains on and the voltage regulators are activated to pull power from the battery 16. As current flows out of the battery 16, it will heat up, rising above the low voltage threshold, and, once it is above this threshold, it can then be charged by turning circuit 44 back on, which will further serve to keep provide some warmth to an otherwise cold battery 16.

In one embodiment, different temperature thresholds are set up for shutting down different parts and operation of the circuit. A specification for a Li-ion battery might set a charge temperature range as being between 0° C. and 45° C. but permit a discharge in the temperature range of −20° C. and 60° C. A series of thresholds can be set for both the high and low temperatures if desired, but this is not required. For example, it is permitted that when a first threshold is passed, the battery charge enable logic outputs a signal to stop all charging of the battery. It may also disconnect the USB supply 18 from being able to be provided to the battery 16. But, this first threshold does not prevent the USB supply 18 from providing power to the circuits 15 and thus does not totally disable input supply switch 42. The power control IC 38 will thus prevent some actions at the first threshold, while permitting others. Discharging of battery 16 and power from the USB supply 18 can be permitted while charging of the battery is disabled and thus blocked. When a second threshold is passed, either high or low, then the a further series of disconnections can take place, for example, at the second threshold, all discharging of the battery 16 can be blocked and the battery supply switch 36 fully disabled. At the second threshold the input supply switch providing power to the circuits 15 can also be disabled, or, alternatively, the system may permit power from the USB 18 to be provided solely to the circuits 15 until a third threshold is reached. Then, when the third threshold is reached, full disconnection of all things outside of the main board 14 can be carried out in a rapid basis.

It is also permitted to set the triggers thresholds at safe regions that are smaller than the battery specification to assist to preserve long term battery life and prevent deterioration of a battery, even if the current conditions are within the specification. For example, if a battery specification states that a charge is to be carried out only between 0° C. and 45° C., then the thresholds to permit charging can be set to be between 5° C. and 40° C. or between 5° C. and 42° C. Similarly, if the discharge specification in the temperature range of −20° C. and 60° C., the system can set a threshold to prevent discharge in outside the temperature range of −10° C. and 55° C. and have a slow shutdown, but if the temperature is outside the temperature range of −20° C. and 60° C. then provide for a fast shutdown.

The present disclosure therefore provides the benefit that the entire main board 14 is fully disconnected from all sources of power, including battery supply, USB supply or combinations thereof, including to prevent charging the battery. This disclosure teaches that it is possible, but not required, that different circuits can be used for shutting down different functions and the shut down sequence can be custom selected as to whether it was a low temperature or a high temperature that triggered the shut down and which threshold was passed, whether a first, lower level threshold, a second level or a top level, danger immanent threshold.

For example, in some instances, the shutdown sequence might favor steps to preserve the operation of the circuits 15 and be timed to permit them to store data and prepare for a loss of power that is about to occur. In other instances, the focus might be to prevent harm to the battery and prevent overheating, fire or explosion. For this goal, the sequence will favor a very rapid, full disconnect of power into and out of the battery 16 with no regard for the circuits 15. Since a fire of the battery is a significant danger will destroy the circuits 15 and other items, if the temperature sensing indicates that a firm might happen, the primary focus becomes to the fully disconnect all circuits as fast as possible and the sequence does not matter; saving the battery is what matters. Thus, the disclosure provides a number of options for determining the shutdown sequence and implementing it. In a simple system, there can be just one option; in other systems there might be high and low temp options that are different from each other.

In one embodiment, each of the circuits 36, 42, 44 and 40 are all on single IC that communicates with the power controller IC 38 or in one embodiment, they circuits that are on the power controller IC 38 itself so that all of these circuits 36, 40, 42 and 44 are located as components on the power controller IC 38.

After the battery has been completely isolated from the system, then the sequence enters the next stage and step 94 is carried out to sense whether the battery temperature is between the selected high and low thresholds. In step 94, it is required that all four of the sensors return to a temperature within the selected range. It is not sufficient if just one of the sensors returns to that range, rather all four of the sensors must return to be within that range. If any one of the sensors is sensing a temperature that is either above or below the selected thresholds then the answer in step 94 will be NO and the various switches and circuits remain off. When the battery is within the selected high temperature and low temperature then the sequence advances to step 96 in which each of the battery switch 36, input supply switch 42, battery charge logic 44, and voltage regulators 40 are enabled.

FIG. 5B shows a different method which is carried out independently from the steps of FIG. 5A. The steps of FIG. 5B can occur concurrently with the steps of FIG. 5A. In particular, the first step of FIG. 5B after the start is to sense the battery temperature with an external thermistor connected to the outside of the battery case. Concurrently with sensing the battery temperature with the external thermistor, the battery is sensed with the internal thermistor that is connected inside the battery case. While in FIG. 5B these are shown as occurring sequentially, one after the other in a preferred embodiment, they both occur concurrently so as to be overlapping in time sequence and both thermistors are checking the battery temperature at the same time. The sensing continues and is always active in steps 100 and 102. While steps 100 and 102 are being carried out, the sequence advances to step 104 in which the battery temperature is compared to a selected threshold from both the external and internal thermistors. The query is carried out to determine whether the battery temperature is above the selected threshold for either the external or the internal thermistor. If it is above the threshold for either one, then the sequence advances to YES and the power control IC 38 is disabled in step 106. The disable signal in this instance goes directly to the power control IC 38 and it can use programed logic stored thereon to conduct a particular shutdown sequence, in a manner as already described.

While the system is shut down, the sequence then advances to step 108 to query whether the battery temperature is below the selected high temperature for both the external and internal thermistors. If the answer is NO, then the circuit returns to step 106 and maintains the power control IC in the off state. Namely, it remains disabled. Once the temperature of the battery is below the selected threshold for both the external and the internal thermistors at the same time, then the answer from sequence step 108 is a YES indicating that the battery is within the operating temperature. The process then advances to step 110 to enable the power control IC. The sequence then returns to the start and the sensing of the battery temperature with both the external and the internal thermistors concurrently with each other continues to be carried out. In the preferred embodiment, the temperature is continuously monitored in steps 100 and 102 so that the queries of steps 104 and 108 can be made and answered at any time.

The steps of FIGS. 5A and 5B are both carried out at the same time and either one can be used to shut down the battery connection to the circuits 15.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a battery;
a load circuit that receives power from the battery for its operation;
a plurality of temperature pads thermally coupled to the battery to reach a temperature corresponding to that of the battery;
a plurality of temperature sensors including a first high temperature sensor, a first low temperature sensor, a second high temperature sensor, and a second low temperature sensor, the temperature sensors being different from the temperature pads,
wherein the first high temperature sensor is coupled to the plurality of temperature sensor pads, the first high temperature sensor outputting a signal indicating that the battery temperature is above a selected high temperature threshold;
wherein the first low temperature sensor is coupled to the plurality of temperature sensor pads, the first low temperature sensor outputting a signal indicating that the battery temperature is below a selected low temperature threshold;
a first OR logic circuit that simultaneously receives as inputs the output from the first high and low temperature sensors and outputs a first error signal if either the first high or low temperature sensors outputs a signal indicating the temperature is outside the selected threshold for the respective first temperature sensors,
wherein the second high temperature sensor is coupled to the plurality of temperature sensor pads, the second high temperature sensor outputting a signal indicating that the battery temperature is above the selected high temperature threshold;
wherein the second low temperature sensor is coupled to the plurality of temperature sensor pads, the second low temperature sensor outputting a signal indicating that the battery temperature is below the selected low temperature threshold;
a second OR logic circuit that simultaneously receives as inputs the output from the first high and low temperature sensors and outputs a second error signal if either the first high or low temperature sensors outputs a signal indicating the temperature is outside the selected threshold for the respective second temperature sensors;
a third OR logic circuit that simultaneously receives as inputs the output from the first OR logic circuit and the second OR logic circuit and outputs a third error signal if either the first or second inputs are error signals; and
a shutdown circuit coupled to the output of the third OR logic circuit that terminates the delivery of all power to the load circuit from all sources and terminates all power to and from the battery when the third error signal is received.

2. The system of claim 1 in which the shutdown circuit comprises:
a battery supply switch circuit having the third error signal as an input to the battery supply switch and the battery supply switch disconnects the power provided from the battery to the load circuit upon occurrence of the third error signal.

3. The system of claim 2 wherein the battery supply switch also disconnects the power provided from a charging source to the battery upon occurrence of the third error signal.

4. The system of claim 1 wherein the shutdown circuit includes an input power supply disconnection switch circuit having the third error signal as an input to that disconnects the power provided from the battery from power supply to terminate all charging of the battery upon occurrence of the third error signal.

5. The system of claim 1 wherein the shutdown circuit includes voltage regulators having the third error signal as an input to the voltage regulators, and the voltage regulators are disabled upon occurrence of the third error signal.

6. The system of claim 1 wherein the shutdown circuit includes a battery charge logic circuit having the third error signal as an input and the battery charge logic circuit disables all charging of the battery upon occurrence of the third error signal.

7. The system of claim 2 wherein the shutdown circuit includes a power control integrated circuit that receives as an input a disable signal from each of the battery supply switch circuit, input power supply disconnection switch circuit and a battery charge logic circuit, any one of which will cause the power control integrated circuit to disconnect the battery from the load circuits and the battery charge circuits.

8. The system of claim 7, further including:
a thermistor that is thermally coupled to the battery that outputs a signal indicative of the temperature of the battery;
an output line from the thermistor to the power control integrated circuit; and
a disable circuit in the power control integrated circuit that disconnects all power to or from the battery if the signal from the thermistor indicates a temperature of the battery higher than a first threshold temperature.

9. The system according to claim 1 wherein the plurality of temperature pads thermally coupled to the battery include at least six different temperature pads all spaced from each other and each thermally coupled to a common temperature based material.

10. The system of claim 1 wherein the common temperature based material is a thermal spreader connected between the battery and the temperature pads.

11. The system of claim 1 wherein a printed circuit board contains the plurality of temperature pads thermally coupled to the battery to reach a temperature corresponding to that of the battery on a first side thereof and has, a second side thereof each of the first high temperature sensor coupled to the plurality of temperature sensor pads, the first low temperature sensor coupled to the plurality of temperature sensor pads, the first OR logic circuit that receives as inputs the output from the first high and low temperature sensors, the second high temperature sensor coupled to the plurality of temperature sensor pads, the second low temperature sensor coupled to the plurality of temperature sensor pads, the second OR logic circuit that receives as inputs the output from the first high and low temperature sensors and the third OR logic circuit that receives as inputs the output from the first OR logic and the second OR logic and outputs a third error signal if either the first or second and second inputs are error signals.

12. A system, comprising:
a battery;
a load circuit that receives power from the battery for its operation;
a plurality of temperature sensors including a first temperature sensor and a second temperature sensor,
wherein the first temperature sensor is constructed by a first technique and is coupled to the battery at a first location, the first temperature sensor outputting a first temperature error signal when the temperature of the battery is outside a first target temperature range;
a plurality of temperature pads thermally coupled to the battery to reach a temperature corresponding to that of the battery, the temperature pads being different from the temperature sensors;
a second temperature sensor constructed by a second technique coupled to the plurality of temperature pads, the second technique being different from the first technique, the second temperature sensor outputting a second temperature error signal when the temperature of the battery is outside a second target temperature range; and
a power control integrated circuit that is coupled to receive an input from the first temperature sensor constructed by a first technique and from the second temperature sensor constructed by a second technique to terminate all power to the load circuit from all sources and terminate all power to and from the battery when either the first temperature sensor or the second temperature sensor outputs a temperature error signal.

13. The system of claim 12 wherein the plurality of temperature pads thermally coupled to the battery a connected on a first side of a printed circuit board.

14. The system of claim 13 wherein first temperature sensor is a thermistor connected to the battery and the second temperature sensor is connected to a second side of the printed circuit board.

15. A method of disconnecting a battery from a load circuit, comprising:
sensing a temperature of a battery with a first high temperature sensor;
outputting a first temperature error signal when the battery temperature is above a selected high temperature threshold;
sensing a temperature of the battery with a first low temperature sensor;
outputting a second temperature error signal when the battery temperature is below a selected low temperature threshold;
simultaneously receiving as inputs output from the first high temperature sensor and output from the first low temperature sensor, and outputting a third error signal if the output from the first high temperature sensor includes the first temperature error signal or the output from the first low temperature sensor includes the second temperature error signal;
sensing a temperature of the battery with a second high temperature sensor;
outputting a fourth temperature error signal when the battery temperature is above the selected high temperature threshold;
sensing a temperature of a battery with a second low temperature sensor;
outputting a fifth temperature error signal when the battery temperature is below the selected low temperature threshold;
simultaneously receiving as inputs output from the second high temperature sensor and output from the second low temperature sensor, and outputting a sixth error signal if the output from the second high temperature sensor includes the fourth temperature error signal or the output from the second low temperature sensor includes the fifth temperature error signal; and
disconnecting a battery from a load circuit and from a charging circuit when third or sixth temperature error signals are output.

16. The method of claim 15 wherein the disconnecting the battery from the load circuit and from the charging circuit comprises:
disabling a battery supply switch circuit, disabling an input power supply disconnection switch circuit, disabling a battery charge logic circuit, and disabling voltage regulators.

17. The method of claim 16, further including:
disabling a power control integrated circuit when any one of the battery supply switch circuit, input power supply disconnection switch circuit, or battery charge logic circuit is disabled.

18. The method of claim 16 wherein disabling the battery supply switch circuit, the disabling the input power supply disconnection switch circuit, the disabling the battery charge logic circuit, and the disabling the voltage regulators occur simultaneously.

19. The method of claim 16 wherein the disabling the battery supply switch circuit, the disabling the input power supply disconnection switch circuit, the disabling the battery charge logic circuit, and the disabling the voltage regulators occur sequentially, with the voltage regulators being disabled before the battery supply switch is disabled.

20. The method of claim 19 wherein the disabling the battery charge logic circuit occurs prior to the disabling the battery supply switch.

* * * * *